Oct. 30, 1923. 1,472,566
J. R. OISHEI
ADJUSTABLE BRACKET FOR MIRRORS AND OTHER ARTICLES
Filed Dec. 8, 1921
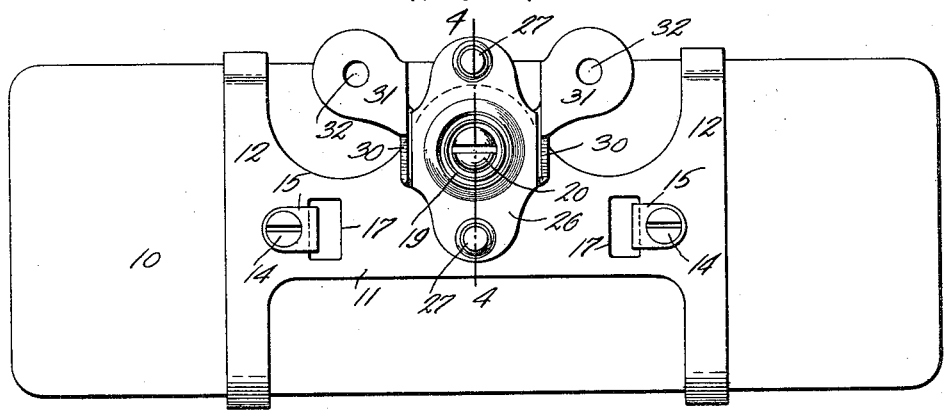
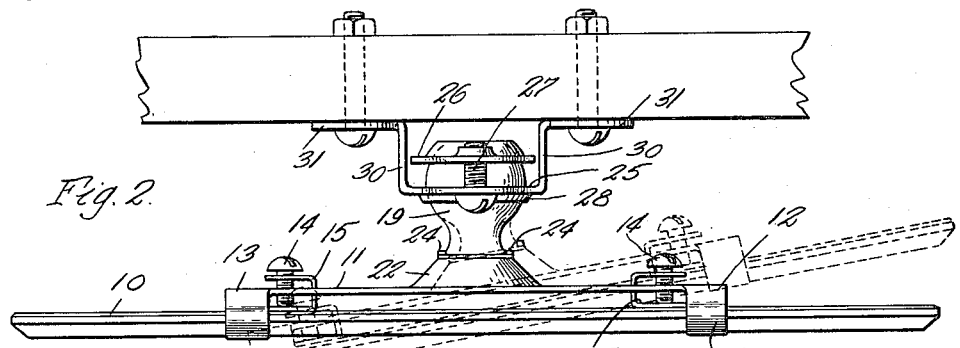
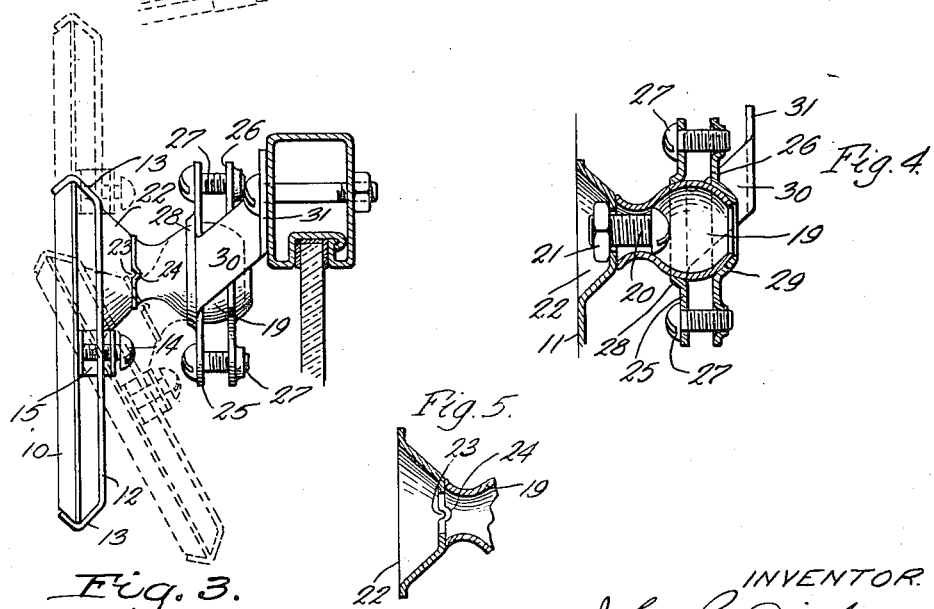
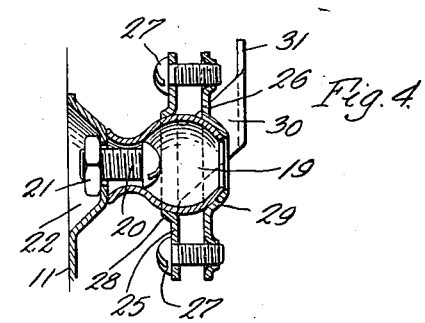
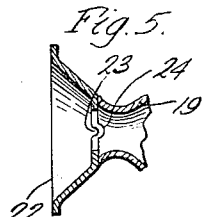
INVENTOR.
John R. Oishei
by Parker & Burchnow
his ATTORNEYS.

Patented Oct. 30, 1923.

1,472,566

UNITED STATES PATENT OFFICE.

JOHN R. OISHEI, OF BUFFALO, NEW YORK.

ADJUSTABLE BRACKET FOR MIRRORS AND OTHER ARTICLES.

Application filed December 8, 1921. Serial No. 520,951.

*To all whom it may concern:*

Be it known that I, JOHN R. OISHEI, a citizen of the United States, residing at Buffalo, in the county of Erie and State of New York, have invented a new and useful Improvement in Adjustable Brackets for Mirrors and Other Articles, of which the following is a specification.

This invention relates to adjustable brackets or supporting devices for mirrors and analogous articles, such as used for mounting a mirror adjustably on an automobile or vehicle so that the mirror can be readily adjusted angularly sufficiently to set it in whatever position may be necessary to enable the driver or occupant of the vehicle to readily see to the rear of the vehicle or in any other desired direction by looking into the mirror.

The object of the invention is to provide an adjustable bracket or support of this character which will enable a limited universal adjustment of the mirror or article supported thereby, and will hold the article rigidly and without vibration in different, adjusted positions, but which is nevertheless of simple and compact construction such that the mirror or article can be located close to the part or support on which it is mounted, and the bracket will be inconspicuous but of neat appearance.

In the accompanying drawings:

Fig. 1 is a rear elevation of a bracket embodying the invention, the bracket with the mirror carried thereby being detached from the support.

Fig. 2 is a plan view thereof, showing the device attached to a support.

Fig. 3 is an end elevation thereof, showing the device attached to a windshield, or the like.

Fig. 4 is a vertical sectional elevation thereof on line 4—4, Fig. 1.

Fig. 5 is a fragmentary vertical section of the holder plate and neck of the ball thereof.

The adjustable bracket or support comprises a holder or section by which the mirror or article is held, an attaching member or section adapted to be secured to a part of a vehicle or any other suitable support, and a ball and socket joint connecting the holder and attaching member whereby the holder is to be adjusted universally to different, angular positions with reference to the attaching member and support on which it is secured.

The adjustable bracket or device is preferably constructed as follows:—

10 represents the mirror or other article to be adjustably supported, and 11 the holder or section on which the mirror is secured or held. This holder comprises a sheet metal plate provided at opposite ends with arms 12, the ends of which are bent to form fingers 13 adapted to extend over and engage opposite edges of the mirror 10. The mirror can be secured in the holder by any suitable means, such for instance as screws 14 passing through threaded holes in the holder plate 11 and adapted to force the mirror outwardly against the fingers 13. As shown, the screws 14 bear at their ends against bearing or protecting pieces 15 which bear against the back of the mirror and are held from turning so that when the screws are tightened they will not scratch or injure the back or reflecting coating of the mirror. The bearing or protecting pieces shown consist of small U-shaped sheet metal pieces which extend through and are held from turning in holes 17 in the holder plate 11, and have holes in one end through which the shanks of the screw pass. The holder can be of any other suitable construction adapted for securing the mirror or articles thereon, the holder or securing means not constituting a part of this invention.

19 represents the ball member of the ball and socket joint, this ball member being rigidly secured to and projecting from one of the sections of the bracket, preferably the holder 11. The ball member 19 is hollow and is preferably formed by drawing from a blank of suitable metal, and it has a segmental spherical, outer end and a reduced neck which bears against the holder plate 11. The ball is secured to the holder plate 11 by a screw 20 which passes through the neck of the ball member and is preferably screwed into a nut 21 seated in a recess or depression 22 in the holder plate 11. The head of the screw bears against the inner end portion of the ball so that by tightening the screw the ball member is clamped tightly against the holder plate 11. The neck of the ball member and the holder plate 11 are provided with interengaging parts, such as small projections 23 on the holder plate engaging in corresponding small notches 24 in the inner end of the neck, to prevent the ball member from turning on the holder plate 11, and thus possibly loosening the screws. The screw can be turned to secure the ball member to the holder plate by a screw driver or tool inserted through a hole in the outer end of the ball.

The attaching member of the bracket comprises complementary, opposed pieces or plates 25 and 26 which form the socket for the ball and are connected by screws 27 or other suitable means for clamping the pieces 25 and 26 on the ball to adjustably retain the latter in the socket. As shown, the plate or piece 25 is provided with a hole surrounded by a flange 28 through which the neck of the ball member passes, which flange is of internal shape conforming to the spherical surface of the ball and forms a seat for the ball. The hole is of somewhat less diameter than the ball so that the plate 25 cannot be forced over the largest part of the ball. The other plate or piece 26 is provided with an opposed, segmental spherical seat 29. The seats of the two pieces 25 and 26 bear against the spherical portion of the ball member at opposite sides of the center of the ball and each is of less maximum diameter than the diameter of the ball so that by tightening the connecting screws 27, the two socket pieces will be clamped on and engage the ball with sufficient friction to hold the ball in the socket in the different positions to which the ball may be adjusted. The socket piece 25 is provided at opposite sides with legs 30 which straddle the other piece 26, and these legs are preferably provided with outwardly bent feet 31 having holes 32 for the passage of screws or other suitable fastening devices for securing the attaching member on a stationary support. By providing these attaching legs on the socket piece 25, which is located between the mirror holder 11 and the other socket piece 26, the socket piece 25 is made stiff and rigid notwithstanding the relatively large hole in the same forming the seat for the ball, and the bracket or socket member can be located close to the mirror holder 11 so that the entire bracket will be compact and project only a very short distance from the support to which the bracket is secured. Nevertheless a considerable range of angular adjustment is provided. The ball and socket joint is preferably located eccentrically relative to the mirror, or near one edge thereof, instead of centrally, so that a substantial change in the elevation of the mirror can be readily effected simply by inverting the mirror as shown by broken lines in Fig. 3.

The clamping screws 27 for the socket pieces 25 and 26 are preferably arranged as shown, with their heads extending forwardly or toward the mirror so that these screws can be turned to clamp the socket with the desired friction on the ball without detaching the bracket or attaching member.

I claim as my invention:—

1. An adjustable bracket for mirrors and other articles, comprising a section to which the article is secured, an attaching section adapted to be secured on a support, and a ball and socket joint connecting said sections, said ball being hollow and having a neck, a screw passing through said neck for securing the ball to one of said bracket sections, and interfitting portions on said section and neck which prevent the ball from turning on said section about said screw.

2. In an adjustable bracket for mirrors and other articles, a ball and socket joint comprising a ball member, and a socket formed by complementary socket pieces having opposed seats in which the ball fits, means for clamping said socket pieces on the ball, and legs on one of said socket pieces and straddling the other socket piece and constructed for attachment to an object.

3. An adjustable bracket for mirrors and other articles comprising a movable section to which the article is secured, an attaching section adapted to be secured on a support, a ball secured to one of said sections, said other section having an opening through which said ball extends and in which the ball is seated, attaching legs projecting from said other section at opposite sides of said opening, a socket piece having an opposed seat for the ball, and screws for forcing said socket piece toward said last mentioned section for gripping the ball.

4. An adjustable bracket for mirrors and other articles, comprising a movable holder to which the article is secured, a ball secured to said holder, an attaching plate having an opening through which the ball extends and in which the ball is seated and also having attaching legs projecting therefrom at opposite sides of said opening, a plate located between said legs and having an opposed seat for the ball, and screws connecting said plates and adapted to draw them towards each other to grip said ball.

5. In an adjustable bracket for mirrors and the like, the combination of a holder plate for the mirror, a ball mounted on said holder plate, and a socket comprising complementary socket pieces having opposed seats in which opposite sides of the ball rest, means for clamping said socket pieces on said ball, and attaching means projecting from one of said socket pieces and straddling the other of said socket pieces, whereby said socket may be connected to a support.

JOHN R. OISHEI.